March 11, 1952     D. W. RENO     2,589,138
MOTORIZED STRIPPING TOOL
Filed May 19, 1948
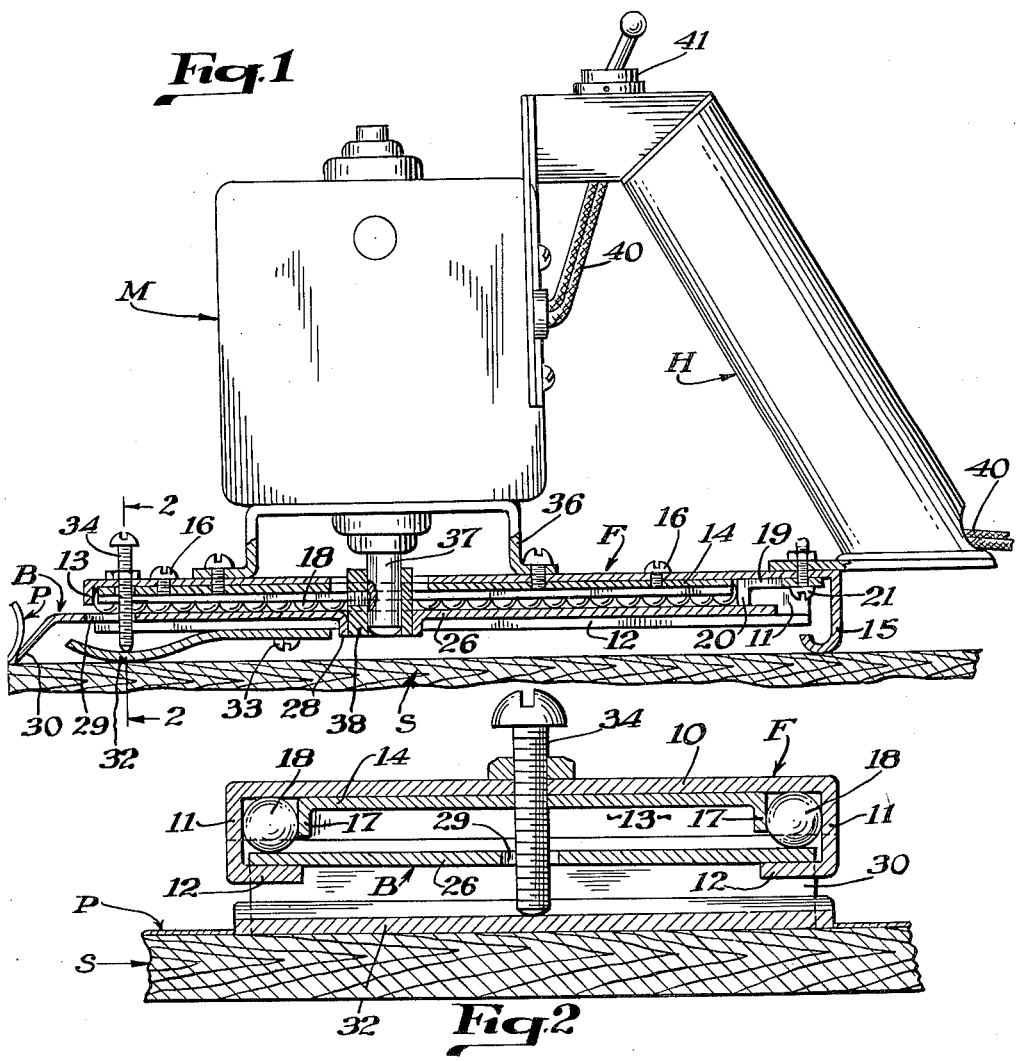
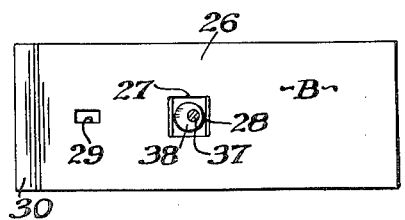
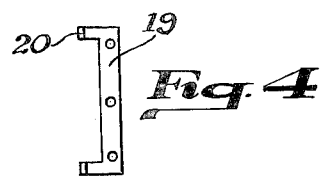
INVENTOR.
DUKE W. RENO.
BY Richey & Watts
ATTORNEYS.

UNITED STATES PATENT OFFICE 2,589,138

MOTORIZED STRIPPING TOOL

Duke W. Reno, Monroeville, Ohio

Application May 19, 1948, Serial No. 27,861

5 Claims. (Cl. 30—272)

This invention relates to tools for stripping or scraping thin layers of material from a base surface, such as paint, wallpaper, or the like.

It is an object of this invention to strip thin layers of material from the base surface smoothly and quickly without marring the surface that is stripped. Briefly, this is accomplished by mounting a stripping blade in framework for reciprocation in a plane substantially parallel to the surface to be stripped, and providing motor means for reciprocating the blade in its mounting, it being understood that the forward portion of the blade has cutting means disposed against the material to be stripped.

Another object resides in adjusting the position of the stripping or cutting means relative to the base surface so that a precise control of the depth of cut may be obtained. In a preferred form this is accomplished by providing longitudinally-spaced support or guide means that engage the base surface, and adjusting one of certain means, preferably that near the blade for the purposes mentioned.

Another object resides in simplification of the construction of the device so that a lightweight, smooth-running, substantially frictionless device may be provided.

These and other objects of my invention will be apparent to those skilled in the art in the following detailed description of a preferred embodiment thereof.

In the drawings:

Fig. 1 is a side elevation of the tool with the stripping mechanism section longitudinal;

Fig. 2 is a transverse section taken on 2—2 of Fig. 1;

Fig. 3 is a plan view of the blade showing how the eccentric or cam drives the blade; and Fig. 4 is a plan view of the rearward ball retaining member.

In the preferred embodiment, my tool comprises framework F, reciprocating stripping blade B, motor M and a suitable handle structure H. In Figs. 1 and 2, the tool is shown stripping a thin layer of material P from the base surface S, it being understood that material P may be paint, varnish, wallpaper, or any other coating applied to the base surface.

Framework F is in the form of a sheet metal channel member and includes an upper plate 10 having depending side flanges 11 and longitudinal under flanges 12, all of which cooperate to form a pair of longitudinal channels at each side of the framework. A forward or stop flange 13 is formed by bending plate 10 down as shown.

A central longitudinal guide member 14 is screwed to the member 10 as at 16 and has depending flanges 17, which cooperate with side flanges 11 to form a ball race. Two rows of anti-friction members, such as balls 18, are disposed in their races and retained by a keeper plate 19 having stop fingers 20 overlying the ends of the races, the plate being retained by fastening means 21.

The stripping blade B has a flat portion 26 which rides beneath the rows of balls 18 and upon under flanges 12. This provides an effective anti-friction mounting for the blade, the area of sliding contact between the blade and flanges 12 being relatively small. In order to provide for reciprocation of the blade B, it is apertured as at 27 and I prefer that the fore-and-aft edges of the apertures be flanged as at 28 to provide wearing surfaces. A forward portion of the blade is also apertured at 29 to receive an adjusting screw and the blade is bent down as at 30 and sharpened to strip material P as indicated in Fig. 1. Driving means for the blade are associated with a motor M which is preferably mounted directly on the tool by bracket assembly 36. In the preferred form the motor shaft 37 carries a cam or eccentric 38 which fits snugly between flanges 28 on the blade and causes longitudinal reciprocation thereof when the motor is in operation.

In order to support or guide the tool on the surface S, a rearward support, foot or flange 15 is bent down from member 10, and a forward adjustable support, guide or foot 32 is provided to engage the surface S adjacent the cutting edge 30 of the blade. Foot or guide 32 may be screwed to each depending flange 12 as at 33 and the position of the tool relative to the surface S may be adjusted by manipulation of set screw 34 that bears against the foot.

Handle means H may be provided in any convenient manner, and, if an electric motor is employed, leads 40 and switch 41 therefor may be mounted as shown.

In operation, the tool is placed against the surface to be stripped with the screw 34 adjusted to provide the proper depth of cut. The tool is held firmly against the surface S and when the motor is placed in operation, the blade rapidly reciprocates and strips off the paint or wallpaper P. I prefer that the blade 30 be sharpened to provide a knife edge parallel to the surface S so that when the tool is properly adjusted, material P is removed without marring or scoring the base surface. The adjustment foot 32 has another advantage in that as the blade edge 30 is sharpened, compensation therefor may be readily effected.

It is noted that the blade reciprocates in a plane substantially parallel to that of the surface S, a slight deviation from the parallel effected by the adjustment of screw 34 not affecting the operation of the device. Although eccentric means are preferred for driving the blade, any mechanical equivalents such as cranks or the like may be substituted therefor without departing from the essence of the invention. I prefer that the motor M be mounted on the tool but in some cases, particularly where increased power is desired, the device could be readily adapted so that the eccentric 38 is driven from a flexible power shaft. It will also be understood that although an electric motor is the most universally convenient source of power, other motors such as air motors or the like may be employed within the scope of the invention.

It will also be apparent that my device is readily adapted for stripping curved surfaces of large radius such as cylindrical surfaces or elliptical surfaces or the like, providing the tool is oriented so that it moves perpendicular to the axis of the surface.

Having completed a detailed description of a preferred form of my invention, it will be obvious that the modifications referred to and others may be made without departing from the mode of operation, and, accordingly, contemplate that the scope of my invention be determined by the appended claims.

What is claimed is:

1. In a stripping tool, framework means comprising an elongated flat body member having parallel channels formed along each edge, a flat stripping blade member disposed between said channels, guide means in said channels to restrict motion of said blade member to linear reciprocation within the channels, the forward end of blade member having a downwardly bent knife portion, front and rear supports extending downwardly from said framework means for engaging the surface to be stripped, said front support being disposed rearwardly of said knife portion, means for adjusting the extension of one of said supports from said framework means to control the depth of cut, motor means, and oscillating means associated with said motor means and blade member to reciprocate the latter in said framework means.

2. In a stripping tool, framework means comprising an elongated flat body member having parallel channels formed along each edge, a flat stripping blade member disposed between said channels, guide means in said channels to restrict motion of said blade member to linear reciprocation within the channels, the forward end of blade member having a downwardly bent knife portion, front and rear supports extending downwardly from said framework means for engaging the surface to be stripped, said front support being disposed rearwardly of said knife portion, means for adjusting the extension of one of said supports from said framework means to control the depth of cut, an aperture in a mid-portion of said flat body member, a slot in said blade member underlying said aperture, a motor mounted on said body member, a motor shaft extending vertically through said aperture, and a cam on said shaft engaging the forward and rearward edges of said blade slot.

3. In a stripping tool, framework means comprising an elongated flat body member having parallel channels formed along each edge, a row of anti-friction bearings in each channel, a flat stripping blade member disposed between the lower flanges of said channels and said bearings, the forward end of said blade member having a downwardly bent knife portion, front and rear supports extending downwardly from said framework means for engaging the surface to be stripped, said front support being disposed rearwardly of said knife portion, means for adjusting the extension of one of said supports from said framework means to control the depth of cut, motor means and oscillating means associated with said motor means and blade member to reciprocate the latter in said framework means.

4. In a stripping tool, framework means comprising an elongated flat body member, its edges bent downwardly and flanged inwardly to form parallel channels, a row of anti-friction bearings in each channel, a flat stripping blade member disposed between the lower flanges of said channels and said bearings, bearing retaining strip parallel to and spaced from said downwardly bent edges, the forward end of blade member having a downwardly bent knife portion, support means extending downwardly from said framework means for engaging the surface to be stripped, said front support being disposed rearwardly of said knife portion, means for adjusting the extension of one of said supports from said framework means to control the depth of cut, motor means, and oscillating means associated with said motor means and blade member to reciprocate the latter in said framework means.

5. In a stripping tool, framework means comprising an elongated flat body member having parallel channels formed along each edge, a flat stripping blade member disposed between said channels, guide means in said channels to restrict motion of said blade member to linear reciprocation within said channels, the forward end of blade member having a downwardly bent knife portion, front and rear support means extending downwardly from said framework means for engaging the surface to be stripped, said front support comprising a flexible metal strip bridging the channels at one end rearwardly of said knife portion and having a curved foot portion for engaging said surface, screw means mounted in said framework means for flexing said strip away from said framework means, to control the depth of cut, motor means, and oscillating means associated with said motor means and blade member to reciprocate the latter in said framework means.

DUKE W. RENO.

REFERENCES CITED

The following references are of record in the file of this patent:

UNITED STATES PATENTS

| Number | Name | Date |
|---|---|---|
| 944,862 | Haven | Dec. 28, 1909 |
| 1,189,202 | Jackson | June 27, 1916 |
| 1,400,379 | Schollmeyer | Dec. 13, 1921 |
| 1,660,134 | Mernit | Feb. 21, 1928 |
| 1,892,867 | Burr | Jan. 3, 1933 |
| 2,161,335 | Cherry | June 6, 1939 |
| 2,395,537 | Crosby | Feb. 26, 1946 |
| 2,503,539 | Aspeek | Apr. 11, 1950 |